United States Patent [19]

Ueno et al.

[11] 4,153,767
[45] May 8, 1979

[54] METHOD OF PRODUCING 1,2-POLYBUTADIENE

[75] Inventors: Haruo Ueno, Chiba; Kyohei Oizumi, Ichihara; Hideo Ishikawa, Chiba; Kohei Nakajima, Ichihara; Nobuhiro Tsujimoto, Ichihara; Osamu Kimura, Ichihara; Hideyuki Aikawa, Ichihara, all of Japan

[73] Assignee: Ube Industries Limited, Ube, Japan

[21] Appl. No.: 853,904

[22] Filed: Nov. 22, 1977

[51] Int. Cl.² ............................ C08F 4/70; C08F 36/06
[52] U.S. Cl. .................................. 526/141; 252/429 B; 252/431 N; 526/136; 526/335
[58] Field of Search ............................. 526/136, 141

[56] References Cited

U.S. PATENT DOCUMENTS

| | | | |
|---|---|---|---|
| 3,336,280 | 8/1967 | Naylor | 526/141 |
| 3,778,424 | 12/1973 | Sugiura et al. | 526/136 |
| 3,824,226 | 7/1974 | Gunther et al. | 526/141 |
| 3,901,868 | 8/1975 | Lleno et al. | 526/136 |
| 4,051,308 | 9/1977 | Holasa | 526/136 |

FOREIGN PATENT DOCUMENTS

| | | | |
|---|---|---|---|
| 4410277 | 5/1969 | Japan | 526/141 |
| 467267 | 2/1971 | Japan | 526/141 |

*Primary Examiner*—Edward J. Smith
*Attorney, Agent, or Firm*—Miller & Prestia

[57] ABSTRACT

Butadiene polymers containing 70% or more of 1,2-structure and a relatively low melting point are produced by polymerizing 1,3-butadiene in the presence of a catalyst which has been prepared by admixing (A) an organic solvent solution containing 1,3-butadiene, a cobalt compound and an organoaluminium compound; (B) an amide compound of the formula (2) or (3):

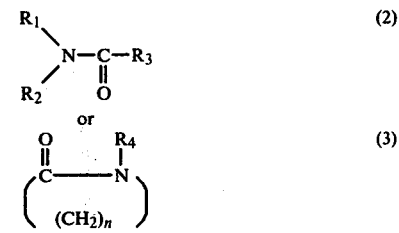

wherein $R_1$, $R_2$ and $R_3$ are respectively an H atom, aliphatic hydrocarbon radical of 1 to 7 carbon atoms or aromatic hydrocarbon radical of 6 or 7 carbon atoms, $R_3$ is H or an aliphatic hydrocarbon radical of 1 to 3 carbon atoms and n is 2 to 5, and; (C) carbon disulfide.

34 Claims, No Drawings

METHOD OF PRODUCING 1,2-POLYBUTADIENE

BACKGROUND OF THE INVENTION

The present invention relates to a process of producing a butadiene polymer. More particularly, the present invention relates to a process of producing 1,2-polybutadiene containing 70% or more of the 1,2-structure, and having a regulated melting point.

It is well-known that syndiotactic 1,2-polybutadiene having a relatively high melting point can be produced by polymerizing 1,3-butadiene in the presence of a catalyst which has been prepared from a solvent soluble cobalt compound and an organoaluminium compound. However, this known process has not yet been successfully utilized in industrial work, because of its disadvantages of low yield and unsatisfactory physical properties of the resultant polymer.

In order to overcome the above-mentioned disadvantages, a new type of catalyst comprising a cobalt compound, an organoaluminium compound and carbon disulfide was described and claimed in British Patent No. 1310621. This type of catalyst can convert 1,3-butadiene in an inert organic solvent to syndiotactic 1,2-polybutadiene having a relatively high melting point of approximately 200° to 215° C. and a high crystallinity. However, this type of catalyst is disadvantageous for industrial production of 1,2-polybutadiene because of the relatively low yield thereof and the difficulty in controlling the melting point of the resultant polymer. In order to eliminate the above-mentioned disadvantages, a still new type of catalyst comprising a cobalt compound, an organoaluminium, carbon disulfide and a nitrile compound was provided. One problem in this catalyst is that the nitrile compound, which is harmful to the human body, is difficult to recover from the polymerization mixture in which the catalyst is contained.

SUMMARY OF THE INVENTION

The present invention seeks to provide a process for producing a 1,2-polybutadiene, especially, 1,2-polybutadienes having various melting points.

The 1,2-polybutadiene is produced in accordance with the process of the present invention which comprises polymerizing 1,3-butadiene in the presence of a catalyst which has been prepared by admixing: (A) a catalyst component solution prepared by dissolving, in an organic solvent containing at least a portion of 1,3-butadiene to be polymerized, (a) at least one cobalt compound which is soluble in said organic solvent and (b) at least one organoaluminium compound of the formula (1)

$$AlR_3 \quad (1)$$

wherein R represents an aliphatic hydrocarbon radical having 1 to 6 carbon atoms, alicyclic hydrocarbon radical having 3 to 6 carbon atoms or phenyl radical; (B) at least one amide compound which is soluble in said organic solvent and selected from the group consisting of the compounds of (i) the formula (2)

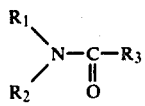

(2)

wherein $R_1$ and $R_2$ represent a hydrogen atom aliphatic hydrocarbon radical having 1 to 7 carbon atoms or aromatic hydrocarbon radical having 6 or 7 carbon atoms, respectively, and $R_3$ represents a hydrogen atom or aliphatic hydrocarbon radical having 1 to 3 carbon atoms, and (ii) the compounds of the formula (3)

(3)

wherein $R_4$ represents a hydrogen atom, aliphatic hydrocarbon radical having 1 to 7 carbon atoms or aromatic hydrocarbon radical having 6 or 7 carbon atoms and n represents an integer of 2 to 5; and; (C) carbon disulfide.

The new type of catalyst usable for the process of the present invention can control the melting point of the resultant 1,2-polybutadiene in a wide range of from about 70° C. to about 200° C.

The 1,2-polybutadiene produced by the process of the present invention can be utilized as a high polymer material over a wide range of uses. For example, the polymers having a melting point of from 140° to 195° C. can be used as a material for producing carbon fibers or various plastics. The polymers having a melting point of from 90° to 160° C. can be utilized as a material for producing stretch films and shrink films. Also, the 1,2-polybutadiene can be utilized as a polymeric bone component of graft-copolymers in which a comonomer such as styrene, acrylonitrile and methyl methacrylate is grafted to the vinyl groups of the 1,2-polybutadiene bone component.

The cobalt component usable for the present invention is not restricted to a special group of cobalt compounds as long as the cobalt compound is soluble in the organic solvent to be contained in the catalyst component solution. For example, the cobalt compound may be selected from β-diketone complexs of cobalt, β-ketoester complexes of cobalt, cobalt salts of organic carboxylic acids having 6 to 15 carbon atoms and halogenated cobalt complexes of the formula (6);

(6)

wherein X represents a halogen atom, Y represents a ligand of the cobalt atom, l represents an integer of from 2 or 3 and n represents an integer of from 1 to 4.

The β-diketone complex of cobalt can be prepared by using, as a ligand of the cobalt atom, a β-diketone of the formula (4)

(4)

wherein $R_5$ and $R_8$ represent an aliphatic hydrocarbon radical having 1 to 3 carbon atoms, respectively, and $R_6$ and $R_7$ represent a hydrogen atom or aliphatic hydrocarbon radical having 1 to 3 carbon atoms, respectively.

The preferable β-diketone complex of cobalt may be, either cobalt (II) acetylacetonate or cobalt (III) acetylacetonate.

The β-ketoester complex of cobalt can be prepared by using, as a ligand of the cobalt atom, a ketoester of the formula (5)

(5)

wherein $R_5$ and $R_8$ represent an aliphatic hydrocarbon radical having 1 to 3 carbon atoms, respectively, and $R_6$ and $R_7$ represent a hydrogen atom or aliphatic hydrocarbon radical having 1 to 3 carbon atoms, respectively. The preferable ketoester complex of cobalt may be cobaltacetoacetic ethyl ester complex.

The cobalt salts of the specified organic carboxylic acids may be selected from cobalt octoate, cobalt naphthenate and cobalt benzoate.

The halogenated cobalt complex of the formula (6) can be prepared by using a compound which is known as a ligand of the cobalt atom. The ligand compound may be selected from tertiary amines, alcohols, tertiary phosphines and N,N-dialkyl amides.

The tertiary amine may be selected from pyridine, triethyl amine, tributyl amine and dimethyl aniline.

The alcohol usable as the ligand of the cobalt atom may be selected from methyl alcohol and ethyl alcohol.

The tertiary phosphine may be selected from triphenyl phosphine and tributyl phosphine.

Also, the N,N-dialkyl amide may be selected from N,N-dimethylformamide, N,N-dimethyl acetamide and N,N-diethyl formamide.

For example, the preferable halogenated cobalt complex of the formula (6) may be selected from a complex of cobalt chloride with pyridine and a complex of cobalt chloride with ethyl alcohol.

The organoaluminium of the formula (1), $AlR_3$ has a hydrocarbon radical R which may be selected from an aliphatic hydrocarbon radical having 1 to 6 carbon atoms, alicyclic hydrocarbon radical having 3 to 6 carbon atoms or phenyl radical. Preferably, the organoaluminium compound is trimethylaluminium, triethylaluminium or triphenylaluminium.

The carbon disulfide usable for the present invention is not restricted to a special grade of carbon disulfide.

In the process of the present invention, the catalyst to be used is characterized by containing therein at least one specified amide compound selected from the compounds of the formulae (2) and (3)

(2)

and

(3)

wherein $R_1$, $R_2$ and $R_4$ respectively represent a hydrogen atom, an aliphatic hydrocarbon radical having 1 to 7 carbon atoms or an aromatic hydrocarbon radical having 6 or 7 carbon atoms, $R_3$ represents a hydrogen atom or an aliphatic hydrocarbon radical having 1 to 3 carbon atoms and n represents an integer of from 2 to 5. The above-specified amide compounds are soluble in the organic solvent of the catalyst component solution.

The amide compound of the formula 2 may be selected from N-methylformamide, N-ethylformamide, N-propylformamide, N,N-dimethylformamide, N,N-diethylformamide, N,N-dipropylformamide, N-methylacetamide, N,N-dimethylacetamide, N-methylformanilide, N,N-diphenylformamide and formanilide.

Also, the amide compound of the formula (3) may be selected from propiolactam, butyrolactam, valerolactam, caprolactam, N-methylpyrrolidone, N-ethylpyrrolidone and N-phenylpyrrolidone.

In the preparation of the catalyst usable for the process of the present invention, the catalyst component solution is prepared by dissolving at least one cobalt compound and at least one organoaluminium in an organic solvent which contains at least a portion of 1,3-butadiene to be polymerized and is capable of dissolving therein the cobalt compound and the organoaluminium. The resultant component solution is preferably aged at a predetermined temperature of from 10° to 50° C. for 30 seconds or more, more preferably, 1 minute or more. The catalyst component solution thus prepared is admixed with at least one amide compound specified above and the carbon disulfide. As long as the the cobalt compound and the organoaluminium are mixed with the 1,3-butadiene solution, the catalyst component solution, the amide compound and the carbon disulfide may be mixed in any sequence.

It is preferable that the 1,3-butadiene to be contained in the catalyst component solution is in a quantity of 1 mole or more, more preferably, 5 moles or more, per mole of the cobalt compound to be contained in the catalyst component solution. The entire quantity of the 1,3-butadiene to be polymerized may be contained in the catalyst component solution. Or, the quantity of the 1,3-butadiene to be contained in the catalyst component solution is a portion of the 1,3-butadiene to be polymerized.

In the case where the entire amount of the 1,3-butadiene to be polymerized is contained in the catalyst component solution, when the amide compound and the carbon disulfide are added in any sequence or simultaneously into the catalyst component solution, the polymerization of the 1,3-butadiene immediately starts. However, in the case where the carbon disulfide is firstly added and, thereafter, the amide compound is added to the catalyst component solution which contains the entire amount of the 1,3-butadiene to be polymerized, it is preferable tht the amide compound be added to the catalyst component solution as soon as possible after the carbon disulfide is added to the solution. If the time period between the addition of the carbon disulfide and the addition of the amide compound is long, the polymerization of the 1,3-butadiene in the presence of a catalyst consisting of the catalyst component solution and the carbon disulfide results in the production of the 1,2-polybutadiene having a high melting point and, therefore, it is impossible to obtain the 1,2-polybutadiene having a low melting point.

The preparation of the catalyst of the present invention is not restricted to a special range of temperature. However, it is preferable that the preparation temperature be in a range of from 10° to 50° C.

In the process of the present invention, it is important that the catalyst be prepared from the cobalt compound, the organoaluminium, the amide compound, the carbon disulfide, the organic solvent and the 1,3-butadiene, in accordance with the method mentioned above. If the 1,3-butadiene is polymerized by using a catalyst which has been prepared by a another method than that of the present invention, the polymerization results in the following disadvantages and, therefore, the purpose of the present invention will never be attained.

If the cobalt compound and the organoalminium are dissolved in an organic solvent which contains no 1,3-butadiene, and then, the amide compound and the carbon disulfide are added to the solution, the resultant catalyst has no catalytic activity for polymerizing the 1,3-butadiene. Also, if the 1,3-butadiene and the amide compound are dissolved in the organic solvent, the cobalt compound and the organoaluminium are then mixed into the solution, and finally, the carbon difulfide is added to the mixture, the utilization of the resultant catalyst causes the resultant 1,2-polybutadiene to be obtained in a lower yield and to have a higher melting point than those of 1,2-polybutadiene obtained by using a catalyst prepared by using the same amounts of the above-mentioned components as those used above in accordance with the present invention.

Further, if the 1,3-butadiene and the carbon disulfide are dissolved in the organic solvent, the cobalt compound and the organoaluminium compound are then mixed with the solution, and thereafter, the amide compound is added to the mixture, the utilization of the resultant catalyst results in a poorer yield of 1,2-polybutadiene than that obtained by using the catalyst of the present invention, even if the amount of the carbon disulfide used in the above-mentioned resultant catalyst is the same as that in the catalyst of the present invention.

In the preparation of the catalyst of the present invention, it is preferable that the cobalt compound be used in an amount of from 0.0001 to 1% by mole, more preferably, from 0.001 to 0.5% by mole, based on the entire amount of the 1,3-butadiene to be polymerized.

The organoaluminium compound is used preferably in an amount of from 0.001 to 10% by mole, more preferably, from 0.01 to 5% by mole, based on the entire amount of the 1,3-butadiene to be polymerized.

Also, it is preferable that the catalyst contains the carbon disulfide in an amount of from 0.0005 to 2% by mole, more preferably, from 0.005 to 1% by mole, based on the entire amount of the 1,3-butadiene to be polymerized.

The addition of the amide compound to the catalyst of the present invention is effective to control the melting point of the resultant 1,2-polybutadiene. That is, the larger the amount of the amide compound contained in the catalyst, the lower the melting point of the resultant 1,2-polybutadiene. Accordingly, it is possible to control the melting point of the 1,2-polybutadiene in a range of from 70° to 200° C. by varying at will the amount of the amide compound to be contained in the catalyst.

However, it should be noted that the yield of the resultant 1,2-polybutadiene decreases with the increase of the amount of the amide compound contained in the catalyst. Accordingly, it is not desirable that the catalyst contain an excessively large amount of the amide compound.

The effect of the amide compound for reducing the melting point and yield of the resultant 1,2-polybutadiene varies by varying the kind of the amide compound used. However, the effect of the amide compound to be used for reducing the melting point and the yield of the 1,2-polybutadiene can be confirmed by conducting experiments using the amide compound. For example, N,N-dimethylformamide is used preferably in an amount of from 0.1 to 40% by mole, based on the entire amount of 1,3-butadiene to be polymerized. N-vinyl pyrrolidone is used preferably in an amount of 0.5 to 50% by mole, based on the entire amount of 1,3-butadiene to be polymerized.

In the preparation of the catalyst component solution, it is preferable that the ratio (Al/Co) by mole of the amount of the organoaluminium to the amount of the cobalt compound be in a range of from 0.1 to 30, more preferably, from 1 to 20.

In the process of the present invention, the yield of the resultant 1,2-polybutadiene increases with the increase of the amount of the carbon disulfide contained in the catalyst. However, it should be noted that an excessively large amount of the carbon disulfide results in decrease of the yield of the 1,2-polybutadiene.

The organic solvent usable for the catalyst component solution may be selected from aromatic hydrocarbons, aliphatic hydrocarbons, alicyclic hydrocarbons, halogenated compounds of the above-mentioned hydrocarbon compounds, and mixtures of two or more of the above-mentioned compounds. Preferably, the organic solvent consists of at least one selected from benzene, toluene, xylene, n-hexane, n-heptane, cyclohexane and chlorobenzene.

In the process of the present invention, the polymerization of the 1,3-butadiene may be carried out in a solution polymerization system in which the entire amount of the 1,3-butadiene to be polymerized is dissolved in an organic solvent. In this case, an amount of the organic solvent in addition to the organic solvent contained in the catalyst component solution is added to the polymerization system. The additional organic solvent may be either the same as or different from the organic solvent contained in the catalyst component solution.

However, it is preferable that the additional solvent be the same as the organic solvent used for preparing the catalyst.

In the solution polymerization system, the concentration of the 1,3-butadiene to be polymerized is not limited to a special range. However, generally, it is preferable that the concentration of the 1,3-butadiene in the solution polymerization system be in a range of from 3 to 50% by weight.

The polymerization in accordance with the process of the present invention can be effected in a bulk polymerization system in which only the organic solvent used for the preparation of the catalyst is contained.

The 1,2-polybutadiene obtained by the process of the present invention contains at least 70% of 1,2-structure. When the 1,2-polybutadiene contains 80% or more of the 1,2-structure, the entire amount of the 1,2-structure in this 1,2-polybutadiene is in a syndiotactic structure. However, when the 1,2-polybutadiene contains 70% or more, but less than 80%, of the 1,2-structure, the syndiotacticity of the 1,2-structure decreases with the decrease in the content of the 1,2-structure in this 1,2-polybutadiene. The solubility of the 1,2-polybutadiene in an organic solvent increases with the decrease of the melting point of the 1,2-polybutadiene. The 1,2-polybutadiene obtained by the process of the present invention has a solubility, for example, the polymer product having a melting point of 189° C. has a small solubility of less than 10% in hot benzene at 80° C. Compared with this, another polymer product having a melting point of 155° C. can be completely dissolved in hot benzene at 80° C.

In the process of the present invention, it is preferable that the polymerization of the 1,3-butadiene be carried out at a temperature of from −20° to 80° C., more preferably, from 5° to 50° C. The polymerization can be conducted either under an ambient pressure or an elevated pressure.

When the concentration of the resultant 1,2-polybutadiene in a polymerization mixture is excessively large, the polymerization mixture is caused to have such a high viscosity that it is difficult to satisfactorily stir the polymerization mixture. Accordingly, it is preferable that the concentration of the 1,3-butadiene in the polymerization mixture at the start of the polymerization process be adjusted to the extent that the concentration of the resultant 1,2-polybutadiene at the end of the polymerization process does not exceed the level of 400 g per liter of the polymerization mixture.

The polymerization process of the present invention can be stopped by any one of conventional stopping methods known to be effective for the polymerization process in which a conventional catalyst consisting of the cobalt compound and the organoaluminium is used. For example, in one stopping method, a large amount of a polar compound which is reactive to the organoaluminium compound, is added to the polymerization mixture. The polar compound may be selected from acetone, alcohols, water and amide compounds. The polymerization mixture may be poured into a large amount of the polar compound.

The above mentioned polar liquid such as acetone, alcohol and water may contain an inorganic acid, for example, hydrochloric acid or sulfuric acid; an organic acid, for example, acetic acid or benzoic acid; an organic amine, for example, monoethanol amine or methylamine; or ammonia. In this case, a small amount of a mixture of the polar liquid and the acid or amine or ammonia is added to the polymerization mixture to stop the polymerization. The polymerization process can be stopped by adding an antioxidant having a hydroxyl or amino radical, to the polymerization mixture. Also, the polymerization process can be stopped by introducing hydrogen chloride gas into the polymerization mixture.

After stopping the polymerization process, the resultant 1,2-polybutadiene polymer may be separated from the polymerization mixture, washed with methyl alcohol or isopropyl alcohol and dried, in accordance with any of conventional methods.

Various embodiments of the process of the present invention in practice are illustrated by the following examples.

In the examples, the content of 1,2-structure in the butadiene polymer product was determined by the measurement of the nuclear magnetic resonance spectrum (NMR) or of the infra-red ray absorption spectrum (IR). The melting point of the butadiene polymer product was determined by a peak temperature of a heat absorption curve drawn by a differential scanning calorimeter (DSC). The reduced specific viscosity of the butadiene polymer product having a melting point of 180° C. or more was measured in a tetrahydronaphthalene solution containing 0.2 g/100 ml of the butadiene polymer product at a temperature of 135° C. The reduced specific viscosity of the butadiene polymer product having a melting point lower than 180° C. was also measured in a tetrahydronaphthalene solution containing 0.15 g/100 ml of the polymer at a temperature of 100° C. The reduced specific viscosity was indicated by the symbol $\tau$ sp/C.

EXAMPLES 1 THROUGH 9 AND COMPARISON EXAMPLE 1

In each of Examples 1 through 9, a glass separable flask having a capacity of 500 ml was subjected to the replacement of its inside atmospheric air by nitrogen gas and, then, charged with 250 ml of dehydrated benzene. 25 g of 1,3-butadiene was charged into the flask and dissolved in the dehydrated benzene. While the solution was maintained at a temperature of 30° C., 2 ml of a benzene solution containing 0.3 millimole of cobalt octoate and 2 ml of a benzene solution containing 1 millimole of triethylaluminium were added to the benzene solution of 1,3-butadiene to provide a catalyst component solution. The catalyst component solution was aged at a temperature of 30° C. for 1 minute. Thereafter, the aged catalyst component solution was admixed with 1 ml of a benzene solution of 50 millimole of the amide compound shown in Table 1 and 1 ml of a benzene solution of 0.3 millimole of carbon disulfide in the sequence mentioned above. The resultant polymerization mixture was stirred at a tempeature of 30° C. for 60 minutes to polymerize the 1,3-butadiene. One liter of methyl alcohol containing 1 g of 2,6-di-tertiarybutyl-4-methylphenol was added to the polymerization mixture to cause the deposit of the resultant 1,2-polybutadiene. The 1,2-polybutadiene was separated from the polymerization mixture by means of filtering, washed with methyl alcohol and, then, dried at a temperature of 30° C. under a reduced pressure. 1,2-polybutadiene in the state of a fine powder was obtained. Table 1 shows the yield, reduced specific viscosity, melting point and the content of 1,2-structure of the resultant 1,2-polybutadiene.

In Comparison Example 1, the same procedures as those used in Example 1 were carried out except that no amide compound was used. The yield and the properties of the resultant polymer are indicated in Table 1.

Table 1

| Example No. | | Amide compound used in catalyst | 1,2-Polybutadiene | | | |
|---|---|---|---|---|---|---|
| | | | Yield (%) | Melting point (°C.) | Reduced specific viscosity ($\eta$ sp/C) | Content of 1,2-structure |
| Comparison Example 1 | | none | 47.7 | 194 | 0.85 | 99.0 |
| Example | 1 | N,N-dimethyl formamide | 44.4 | 92 | 0.80 | 74.0 |
| " | 2 | N-methyl formamide | 56.0 | 99 | 0.85 | 75.5 |
| " | 3 | N-methyl acetamide | 68.4 | 114 | 0.87 | 79.6 |
| " | 4 | N,N-dimethyl acetamide | 64.0 | 113 | 0.86 | 79.5 |
| " | 5 | Formanilide | 70.3 | 127 | 0.89 | 80.3 |

Table 1-continued

| Example No. | | Amide compound used in catalyst | 1,2-Polybutadiene | | | |
|---|---|---|---|---|---|---|
| | | | Yield (%) | Melting point (°C.) | Reduced specific viscosity (η sp/C) | Content of 1,2-structure |
| " | 6 | N,N-diphenyl formamide | 87.8 | 128 | 0.88 | 80.5 |
| " | 7 | N-methyl formanilide | 90.4 | 113 | 0.85 | 79.4 |
| " | 8 | Caprolactam | 18.0 | 97 | 0.84 | 74.0 |
| " | 9 | N-methyl pyrrolidone | 60.1 | 108 | 0.86 | 79.4 |

EXAMPLES 10 THROUGH 24 AND COMPARISON EXAMPLE 2

In each of Examples 10 through 24, a glass separable flask filled with nitrogen gas and having a capacity of 2 liters was charged with 760 ml of dehydrated benzene. 74 g of 1,3 butadiene was dissolved in the dehydrated benzene. The solution was adjusted to a temperature of 30° C., and mixed with 2 ml of a benzene solution of 1 millimole of cobalt octoate and 2 ml of a benzene solution of 2 millimole of triethylaluminium. The resultant catalyst component solution was aged at a temperature of 30° C. for 1 minute. The catalyst component solution was admixed with an amide compound indicated in Table 2 in an amount shown in Table 2 and 0.6 millimole of carbon disulfide in the sequence mentioned above. The resultant polymerization mixture was stired at a temperature of 30° C. for 60 minutes to polymerize the 1,3-butadiene.

The resultant polymerization mixture was added to 1 liter of methyl alcohol containing 1 g of 2,6-di-tertbutyl-4-methylphenol to cause the deposit of the resultant 1,2-polybutadiene. The 1,2-polybutadiene was separated from the polymerization mixture, washed with methyl alcohol and, then, dried at a temperature of 30° C. under a reduced pressure. 1,2-polybutadiene in the state of a powder was obtained.

In Comparison Example 2, the same procedures as those used in Example 10 were carried out except that no amide compound was used.

The yield, melting point, reduced specific viscosity and content of 1,2-structure of the resultant polymer in each of Examples 10 through 24 and Comparison Example 2 are indicated in Table 2.

Table 2

| Example No. | Amide compound used | | 1,2-polybutadiene | | | |
|---|---|---|---|---|---|---|
| | Compound | Amount (milli-mole) | Yield (%) | Melting point (°C.) | Reduced specific viscosity (η sp/C) | Content of 1,2-structure (%) |
| Comparison Example 2 | none | 0 | 60.0 | 195 | 0.85 | 99.0 |
| Example 10 | | 40 | 79.1 | 122 | 0.93 | 83.7 |
| " 11 | N,N-dimethyl | 100 | 88.1 | 100 | 0.85 | 78.7 |
| " 12 | formamide | 150 | 55.3 | 92 | 0.84 | 70.8 |
| " 13 | | 200 | 47.1 | 87 | 0.80 | 70.1 |
| " 14 | N-methyl | 40 | 75.3 | 124 | 0.88 | 82.5 |
| " 15 | formamide | 100 | 64.0 | 106 | 0.86 | 73.0 |
| " 16 | N-methyl formanilide | 100 | 99.4 | 121 | 0.88 | 84.7 |
| " 17 | N-methyl acetamide | 100 | 81.3 | 125 | 0.85 | 82.6 |
| " 18 | | 40 | 77.0 | 152 | 0.90 | 88.4 |
| " 19 | N,N-dimethyl acetamide | 100 | 82.9 | 120 | 0.91 | 84.6 |
| " 20 | | 200 | 72.2 | 107 | 0.82 | 81.3 |
| " 21 | | 40 | 94.0 | 166 | 0.84 | 92.5 |
| " 22 | N-vinyl | 100 | 90.0 | 145 | 0.82 | 90.0 |
| " 23 | pyrrolidone | 200 | 85.0 | 120 | 0.78 | 86.2 |
| " 24 | | 500 | 71.0 | 100 | 0.80 | 77.9 |

EXAMPLES 25 THROUGH 30

In each of Examples 25 through 30, procedures identical to those utilized in Example 1 were carried out, except that N,N-dimethyl formamide was used in an amount shown in Table 3. Table 3 shows the yield, reduced specific viscosity, melting point and content of 1,2-structure of each of the resultant polymers.

Table 3

| Example No. | Amount of N,N-dimethyl-formamide (millimole) | 1,2-Poybutadiene | | | |
|---|---|---|---|---|---|
| | | Yield (%) | Melting point (°C.) | Reduced specific viscosity (η sp/C) | Content of 1,2-structure |
| Example 25 | 2 | 80.4 | 166 | 0.84 | 92.5 |
| 26 | 5 | 76.1 | 151 | 0.84 | 88.0 |
| 27 | 10 | 72.0 | 132 | 0.81 | 75.5 |
| 28 | 20 | 59.5 | 118 | 0.78 | 80.0 |
| 29 | 30 | 58.7 | 98 | 0.79 | 76.8 |
| 30 | 100 | 28.5 | 86 | 0.75 | 68.6 |

EXAMPLE 31

A glass separable flask filled with nitrogen gas and having a capacity of 500 ml was charged with 250 ml of dehydrated benzene. 25 g of 1,3-butadiene were dissolved in the dehydrated benzene. The solution was adjusted to a temperature of 30° C. 10 ml of a benzene solution containing 20 millimole of 1,3-butadiene, 0.3 millimole of cobalt octoate and 1 millimole of triethylaluminium were aged at a temperature of 30° C. for 10 minutes and, then, added to the 1,3-butadiene solution. Thereafter, 10 ml of a benzene solution of 50 millimole of N,N-dimethyl formamide and 1 ml of a benzene solution of 0.3 millimole of carbon disulfide was added to the above-prepared solution in the sequence mentioned above. The resultant polymerization mixture was stirred at a temperature of 30° C. for 60 minutes to polymerize the 1,3-butadiene. The resultant polymer was separated, washed and dried by the same method as utilized in Example 1. The resultant 1,2-polybutadiene had a yield of 47.4%, a melting point of 97° C., a reduced specific viscosity of 0.80 and a content of 1,2-structure of 77.0%.

EXAMPLES 32 THROUGH 35

In each of Examples 32 to 35, a one liter glass separable flask filled with nitrogen gas was charged with 400 ml of dehydrated monochlorobenzene. 50 g of 1,3-butadiene was dissolved in the dehydrated monochlorobenzene, and the solution was adjusted to a temperature of 30° C.

3.2 ml of a monochlorobenzene solution containing 0.28 millimole of cobalt octoate and 1.40 millimole of triethylaluminium were added to the 1,3-butadiene solution. The resultant catalyst component solution was aged at a temperature of 30° C. for 1 minute. Thereafter, N,N-dimethylformamide in an amount shown in Table 4 was added to the aged catalyst component solution. Finally, 6 ml of a monochlorobenzene solution containing 0.79 millimole of carbon disulfide were added to the solution. Thereafter, the resultant polymerization mixture was stirred at a temperature of 30° C. for 180 minutes to polymerize the 1,3-butadiene. The polymerization was stopped by introducing 0.5 g of hydrogen chloride gas into the polymerization mixture. 500 ml of methyl alcohol was added dropwise to the polymerization mixture to cause the deposit of the resultant 1,2-polybutadiene. The deposited 1,2-polybutadiene was separated, washed and dried by the same method as utilized in Example 1. Table 4 shows the yield, melting point, reduced specific viscosity and content of 1,2-structure of the polymer obtained.

Table 4

| Example No. | Amount of N,N-dimethyl formamide (millimole) | 1,2-polybutadiene | | | |
|---|---|---|---|---|---|
| | | Yield (%) | Melting point (°C.) | Reduced specific viscosity ($\eta$ sp/C) | Content of 1,2-structure (%) |
| Example 32 | 21 | 89.4 | 147 | 1.31 | 87.7 |
| " 33 | 41 | 82.8 | 137 | 1.21 | 82.4 |
| " 34 | 62 | 67.5 | 118 | 1.33 | 79.2 |
| " 35 | 82 | 61.0 | 112 | 1.09 | 78.4 |

EXAMPLES 36, 37 AND 38

In each of Examples 36 to 38, procedures identical to those utilized in Example 35 were carried out, except that 1,3-butadiene was used in an amount of 62.7 g and the polymerization was conducted for a period of 60 minutes at a temperature shown in Table 5. The yield, melting point, reduced specific viscosity and 1,2-structure of each of the resultant polymers are indicated in Table 5.

Table 5

| Example No. | Polymerization temperature (°C.) | 1,2-polybutadiene | | | |
|---|---|---|---|---|---|
| | | Yield (%) | Melting point (°C.) | Reduced specific viscosity ($\eta$ sp/C) | Content of 1,2-structure (%) |
| Example 36 | 20 | 68.2 | 106 | 1.87 | 80.66 |
| " 37 | 25 | 69.0 | 109 | 1.48 | 78.7 |
| " 38 | 30 | 71.5 | 110 | 1.16 | 78.5 |

EXAMPLES 39 and 40

In each of Examples 39 and 40, the same operations as those in Example 32 were conducted, except that the N,N-dimethyl formamide was used in an amount of 50 millimole, the carbon disulfide was used in a quantity shown in Table 6, and the polymerization was performed for 60 minute. Table 6 also shows the yield, melting point, reduced specific viscosity and content of 1,2-structure of each of the resultant polymers.

Table 6

| Ex. No. | Amount of carbon disulfide (millimole) | 1,2-polybutadiene | | | |
|---|---|---|---|---|---|
| | | Yield (%) | Melting point (°C.) | Reduced specific viscosity ($\eta$ sp/C) | Content of 1,2-structure (%) |
| Ex. 39 | 1.85 | 77.1 | 127 | 1.42 | 84.9 |
| " 40 | 2.78 | 69.0 | 125 | 1.34 | 82.5 |

EXAMPLE 41

A one liter glass separable flask filled with nitrogen gas was charged with 400 ml of dehydrated monochlorobenzene. 50 g of 1,3-butadiene was dissolved in the dehydrated monochlorobenzene, and the resultant solution was adjusted to a temperature of 30° C. 10 ml of a monochlorobenzene solution containing 2.80 millimole of 1,3-butadiene, 0.28 millimole of cobalt octoate and 1.40 millimole of triethylaluminium was aged at a temperature of 30° C. for 10 minutes and, then, admixed to the 1,3-butadiene solution. The resultant catalyst component solution was mixed with 10 ml of a monochlorobenzene solution containing 50 millimole of N,N-dimethylformamide, and finally, with 6 ml of a monochlorobenzene solution containing 0.79 millimole of carbon disulfide.

The resultant polymerization mixture was stirred at a temperature of 30° C. for 60 minutes to polymerize the 1,3-butadiene. The resultant 1,2-polybutadiene was isolated by the same method as utilized in Example 1. The resultant polymer had an yield of 65.0%, a melting point of 125° C., a reduced specific viscosity of 1.40 and a content of 1,2-structure of 83.8%.

EXAMPLES 42 and 43

In each of Example 42 and 43, a one liter capacity glass separable flask, from which the inside atmospheric air had been drawn out and replaced by nitrogen gas, was charged with 500 ml of dehydrated liquid 1,3-butadiene. The dehydrated liquid 1,3-butadiene was mixed with 36 millimole of N,N-dimethylformamide and, then, with 1 ml of a monochlorobenzene solution containing 0.87 millimole of carbon disulfide, while the mixture was stirred at a temperature of 15° C. in Example 42 and 10° C. in Example 43. 22 ml of a monochlorobenzene solution containing 0.46 millimole of cobalt (III) acetyl acetonate, 1.83 millimole of triethylaluminium and 9 millimole of 1,3-butadiene was aged at a temperature of 25° C. for 5 minutes, and thereafter, admixed with the above-prepared mixture containing 1,3-butadiene, N,N-dimethylformamide and carbon disulfide. The resultant polymerization mixture was stirred at a temperature of 15° C. in Example 42 and 10° C. in Example 43, for 90 minutes to polymerize the 1,3-butadiene. The polymerization was stopped by adding dropwise 500 ml of methyl alcohol to the polymerization mixture. The resultant 1,2-polybutadiene was precipitated from the polymerization mixture and separated, washed, and dried by the same method as utilized in Example 1. The yields and properties of the resultant polymers are shown in Table 7.

Table 7

| Example No. | Polymerization temperature (°C.) | 1,2-polybutadiene | | | |
|---|---|---|---|---|---|
| | | Yield (%) | Melting point (°C.) | Reduced specific viscosity ($\eta$ sp/C) | Content of 1,2-structure (%) |
| Ex. 42 | 15 | 15 | 104 | 0.74 | 80.2 |
| "43 | 10 | 13 | 107 | 0.88 | 80.5 |

What we claim is:

1. A process for producing 1,2-polybutadiene comprising polymerizing 1,3-butadiene in the presence of a catalyst which has been prepared by admixing: (A) a catalyst component solution prepared by dissolving, in an organic solvent containing at least a portion of 1,3-butadiene to be polymerized, (a) at least one cobalt compound which is soluble in said organic solvent and (b) at least one organoaluminum compound of the formula (1)

$$AlR_3 \qquad (1)$$

wherein R represents an aliphatic hydrocarbon radical having 1 to 6 carbon atoms, an alicyclic hydrocarbon radical having 3 to 6 carbon atoms or phenyl radical; (B) N,N-dimethylformamide and; (C) carbon disulfide.

2. A process as claimed in claim 1, wherein said cobalt compound is selected from β-diketone complexes of cobalt, β-ketoester complexes of cobalt, cobalt salts of organic carboxylic acids having 6 to 15 carbon atoms and halogenated cobalt complexes of the formula (6)

$$CoX_l \cdot Y_m \qquad (6)$$

wherein X represents a halogen atom, Y represent a ligand of the cobalt atom, l represents an integer of 2 or 3 and m represents an integer of 1 to 4.

3. A process as claimed in claim 2, wherein said β-diketone complexes of cobalt have been prepared by using, as a ligand of the cobalt atom, a β-diketone of the formula (4)

wherein $R_5$ and $R_8$ represent an aliphatic hydrocarbon radical having 1 to 3 carbon atoms, respectively, and $R_6$ and $R_7$ represent a hydrogen atom or aliphatic hydrocarbon radical having 1 to 3 carbon atoms, respectively.

4. A process as claimed in claim 3, wherein said β-diketone complex of cobalt is selected from cobalt (II) acetylacetonate and cobalt (III) acetylacetonate.

5. A process as claimed in claim 2, wherein said β-ketoester complexes of cobalt have been prepared by using, as a ligand of the cobalt atom, a ketoester of the formula (5)

wherein $R_5$ and $R_8$ represent an aliphatic hydrocarbon radical having 1 to 3 carbon atoms, respectively, and $R_6$ and $R_7$ represent a hydrogen atom or aliphatic hydrocarbon radical having 1 to 3 carbon atoms, respectively.

6. A process as claimed in claim 5, wherein said ketoester complex of cobalt is a cobalt-acetoacetic ethyl ester complex.

7. A process as claimed in claim 2, wherein said cobalt salt of organic carboxylic acid is selected from cobalt octoate, cobalt naphthenate and cobalt benzoate.

8. A process as claimed in claim 2, wherein said ligand in said halogenated cobalt complexes is selected from tertiary amines, alcohols, tertiary phosphines and N,N-dialkylamides.

9. A process as claimed in claim 8, wherein said tertiary amine is selected from pyridine, triethyl amine, tributyl amine and dimethyl aniline.

10. A process as claimed in claim 8, wherein said alcohol is selected from methyl alcohol and ethyl alcohol.

11. A process as claimed in claim 8, wherein said tertiary phosphine is selected from triphenyl phosphine and tributyl phosphine.

12. A process as claimed in claim 8, wherein said N,N-dialkylamide is selected from N,N-dimethylformamide, N,N-dimethylacetamide and N,N-diethylformamide.

13. A process as claimed in claim 8, wherein said halogenated cobalt complex is selected from a complex of cobalt chloride with pyridine and a complex of cobalt chloride with ethyl alcohol.

14. A process as claimed in claim 1, wherein said organoaluminium compound is selected from trimethylaluminium, triethylaluminium and triphenylaluminium.

15. A process as claimed in claim 1, wherein said organic solvent is selected from aromatic hydrocarbons, aliphatic hydrocarbons, alicyclic hydrocarbons, halogenated compounds of the above-mentioned hydrocarbon compounds and mixtures of two or more of the above-mentioned compounds.

16. A process as claimed in claim 1, wherein said organic solvent consists of at least one selected from benzene, toluene, xylene, n-hexane, n-heptane, cyclohexane, chlorobenzene.

17. A process as claimed in claim 1, wherein said 1,3-butadiene is polymerized in an organic solvent.

18. A process as claimed in claim 17, wherein said organic solvent is the same as the organic solvent used for preparing the catalyst.

19. A process as claimed in claim 1, wherein said catalyst component solution is aged for at least 30 seconds.

20. A process as claimed in claim 1, wherein the amount of said 1,3-butadiene to be dissolved in said catalyst component solution is at least 1 mole per mole of said cobalt compound used.

21. A process as claimed in claim 1, wherein said organic solvent contains the entire amount of 1,3-butadiene to be polymerized.

22. A process as claimed in claim 1, wherein said catalyst has been prepared at a temperature of from 10° to 50° C.

23. A process as claimed in claim 1, wherein said cobalt compound is used in an amount of from 0.0001 to 1% by mole based on the entire amount of 1,3-butadiene to be polymerized.

24. A process as claimed in claim 1, wherein said organoaluminium compound is used in an amount of from 0.001 to 10% by mole based on the entire amount of 1,3-butadiene to be polymerized.

25. A process as claimed in claim 1, wherein said carbon disulfide is used in an amount of from 0.0005 to 2% by mole based on the entire amount of said 1,3-butadiene to be polymerized.

26. A process as claimed in claim 1, wherein the ratio by mole of said organoaluminium compound to said cobalt compound (Al/Co) is in a range of from 0.1 to 30.

27. A process as claimed in claim 1, wherein the resultant 1,2-polybutadiene contains at least 70% of 1,2-structure.

28. A process as claimed in claim 27, wherein said 1,2-structure is a syndiotactic 1,2-structure.

29. A process as claimed in claim 1, wherein the resultant 1,2-polybutadiene has a melting point of from 70° to 200° C.

30. A process as claimed in claim 1, wherein said polymerization is carried out at a temperature of from −20° to 80° C.

31. A process as claimed in claim 1, wherein said polymerization is carried out in a solution polymerization system.

32. A process as claimed in claim 31, wherein the concentration of 1,3-butadiene in the solution polymerization system is in a range of from 3 to 50% by weight.

33. A process as claimed in claim 1, wherein said polymerization is carried out in a bulk polymerization system.

34. A process as claimed in claim 1, wherein the amount of N,N-dimethylformamide is in a range of from 0.1 to 40% by mole based on the entire amount of 1,3-butadiene to be polymerized.

* * * * *